(12) United States Patent
de Jong et al.

(10) Patent No.: US 8,155,490 B2
(45) Date of Patent: Apr. 10, 2012

(54) FIBER OPTIC CABLE FURCATION ASSEMBLIES AND METHODS

(75) Inventors: Michael de Jong, Colleyville, TX (US);
Paul X. Devereaux, Dallas, TX (US);
Joshua D. Raker, Lewisville, TX (US);
Gerry J. Harvey, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/241,491

(22) Filed: Sep. 30, 2008

(65) Prior Publication Data
US 2010/0220964 A1 Sep. 2, 2010

(51) Int. Cl.
*G02B 6/44* (2006.01)
*G02B 6/00* (2006.01)

(52) U.S. Cl. .................... 385/100; 385/137; 385/139

(58) Field of Classification Search ............... None
See application file for complete search history.

(56) References Cited

U.S. PATENT DOCUMENTS

| | | | | |
|---|---|---|---|---|
| 7,210,856 B2 * | 5/2007 | Ringgenber | .............. | 385/53 |
| 2005/0276551 A1 * | 12/2005 | Brown et al. | .............. | 385/100 |
| 2007/0110384 A1 * | 5/2007 | Cody et al. | .............. | 385/134 |
| 2007/0179485 A1 * | 8/2007 | Yeik et al. | .............. | 606/15 |

* cited by examiner

*Primary Examiner* — Tina Wong

(57) ABSTRACT

Furcation assemblies (100) for furcating a fiber optic drop cable (10) are disclosed. An example furcation assembly includes a furcation member (110) having an elongate furcation body (112) defining an axial channel (130) with a front section (132). The channel front section is configured to accommodate and be secured to either a buffer tube (30) of a buffered drop cable or a protective cover (20) of an unbuffered drop cable. A flexible guide (150) is secured to the furcation member back end. A flexible protection member (180) slidably fits within the guide back end and is telescopically adjustable relative thereto. To create a cable assembly (200) using the furcation assembly, the furcation member is secured to the drop cable so that the optical fiber (40) carried thereby is passed through the furcation member, through the guide and through the protection member to form an exposed fiber section. The fiber end (41) of the exposed fiber section is then connectorized with a connector (200) and the protection member is slid over the exposed fiber portion and is connected to the connector back end (214). Furcation assemblies and methods for handling multiple fibers are also disclosed.

23 Claims, 13 Drawing Sheets

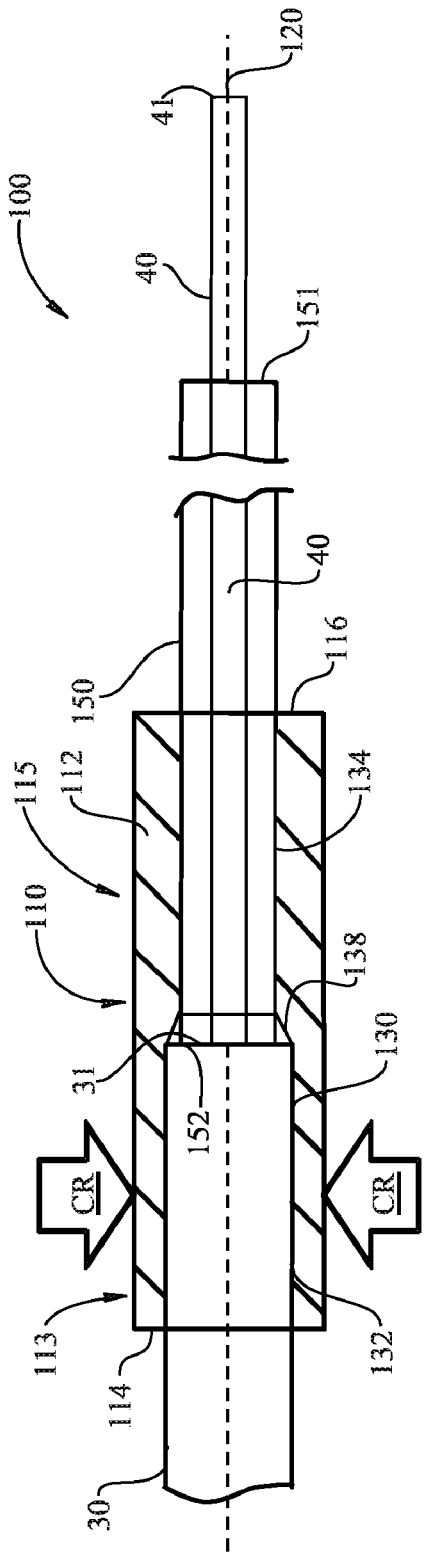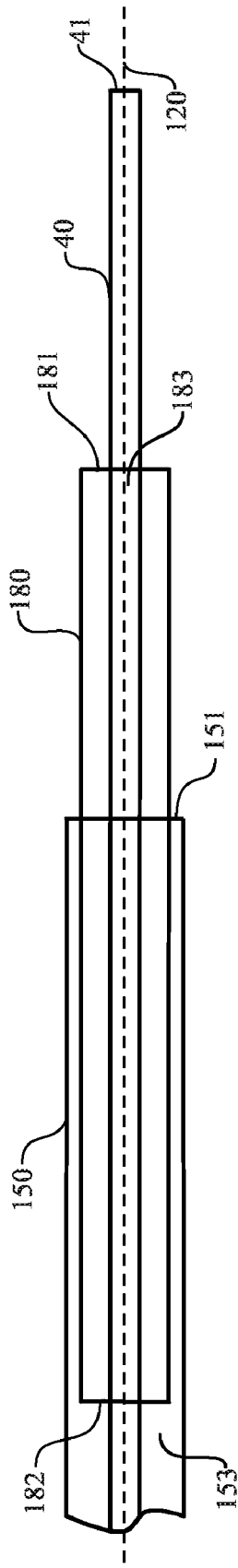
FIG. 7
FIG. 8

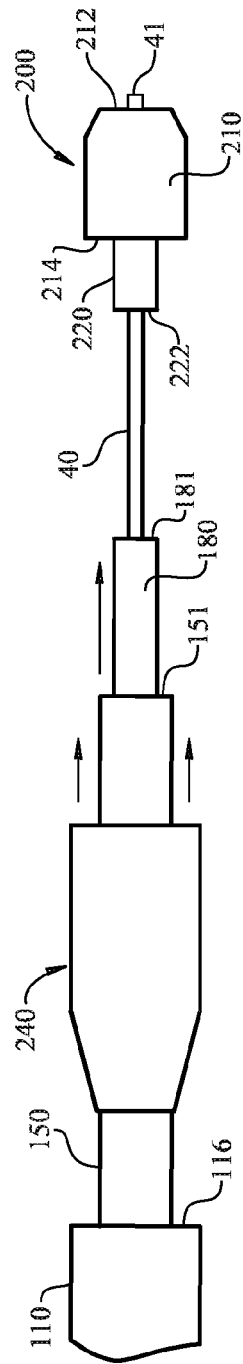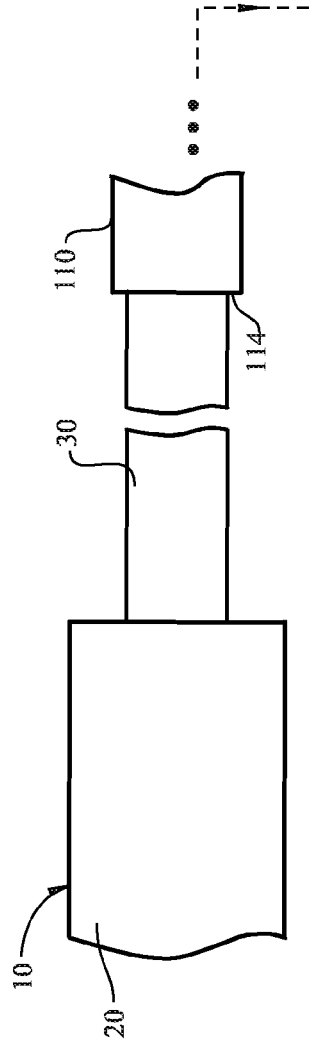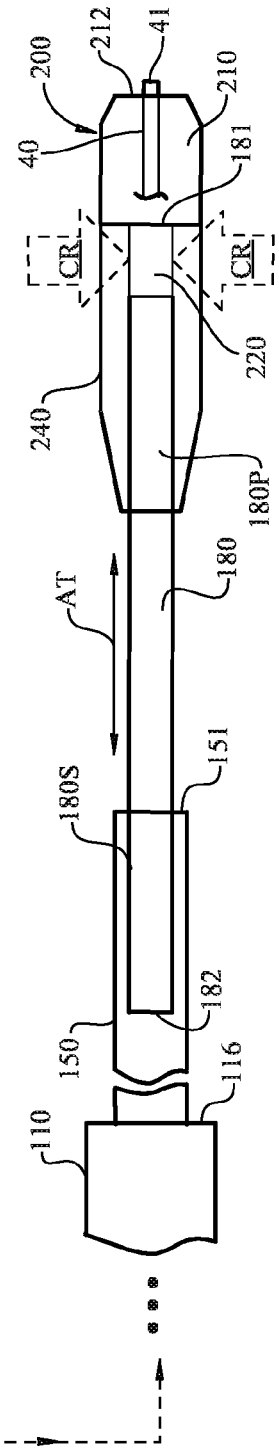

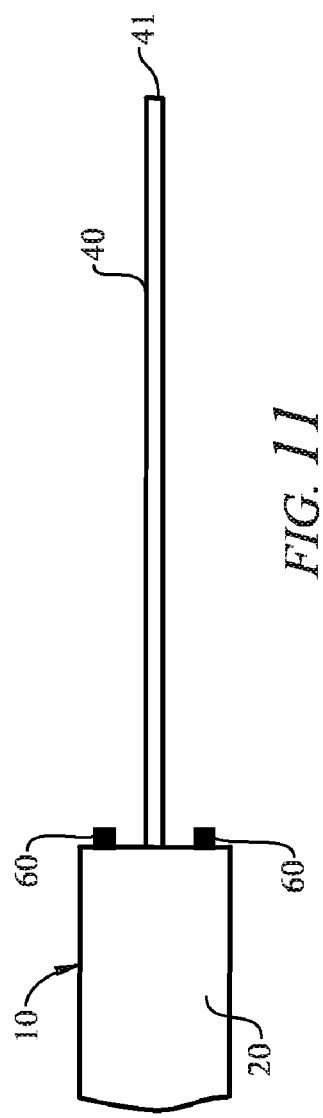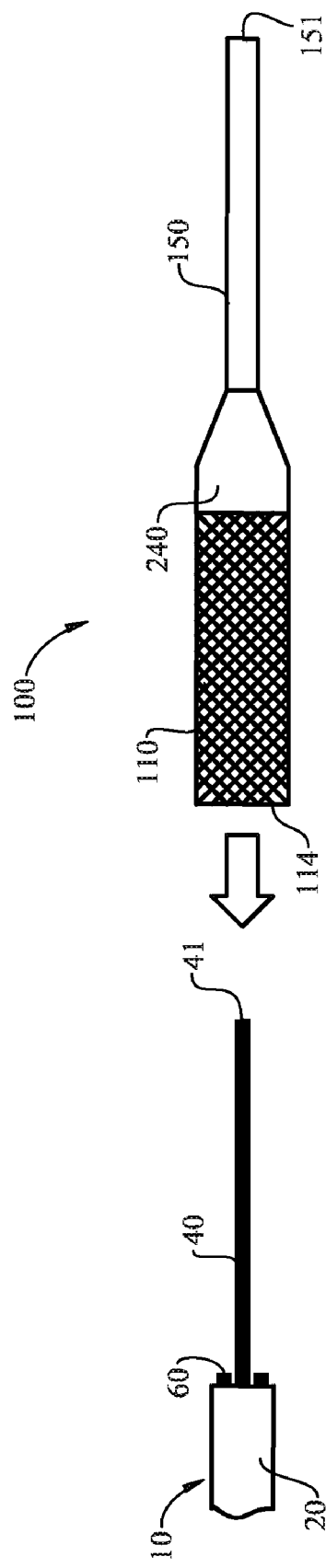

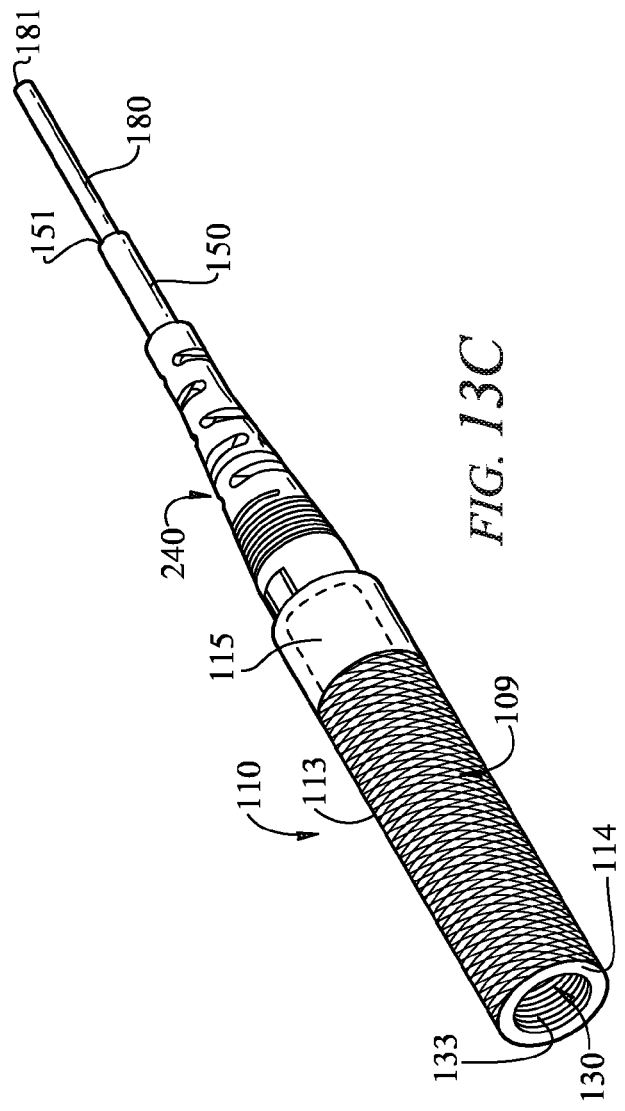
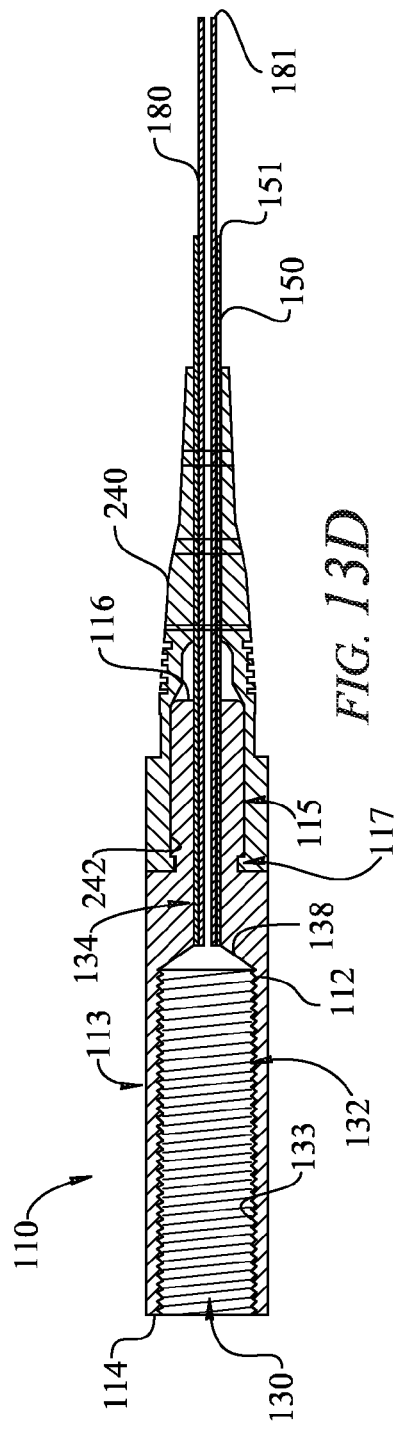
FIG. 13C
FIG. 13D

FIBER OPTIC CABLE FURCATION ASSEMBLIES AND METHODS

BACKGROUND OF THE INVENTION

1. Field of the Invention

The present invention relates generally to fiber optic cable assemblies, and in particular relates to fiber optic drop cable furcation assemblies and methods.

2. Technical Background of the Invention

Fiber optic communications has experienced explosive growth. In just a few years, the transmission of communication signals for voice, video, data, and the like has soared, and more growth is planned as fiber optic communication technology improves and networks expand to provide greater access.

Fiber optic cables are the backbone of fiber optic communication systems. Fiber optic cables carry optical fibers and other cable elements, which are protected from the external environment by an external jacketing. The cable fibers may be surrounded by strength members and protective elements, and may be loosely disposed within tubes ("buffer tubes").

Optical fiber cables that carry optical signals to a home or other locations from a connection point on the distribution cable in so-called "fiber-to-the-X" (FTTX) networks are referred to in the art as "drop cables." At the end of a drop cable, the fibers are extracted from the cable and inserted into fiber optic connection devices, such as connectors or splices. This process is referred to in the art as "furcation." The furcation process must be performed with great care and precision in order to minimize losses in the optical signal. Performing the furcation process can take a great deal of time because each optical fiber in a drop cable is usually manually routed and/or furcated and then individually connected to other optical fibers. A furcation assembly thus serves to organize the loose fibers and to protect the completed connections, while also allowing individual optical fibers to be easily handled, connectorized, and spliced. The furcation assembly also prevents degradation of the prepared fibers and protects the fiber ends from moisture, dust, and other contaminants.

Furcating drop cables is required because available connectors are not designed to be installed on large, rigid, outdoor-rated drop cables. Products are currently available to furcate a drop cable, or transition it into a small unprotected fiber tube. While these products provide some protection for the coated fiber as it enters the connector, the transition from the drop cable to the buffer tube (which typically has 1 mm outside diameter (OD)) is not particularly robust.

An additional difficulty in furcating a drop cable is installing a mechanical splice connector on a furcated optical fiber, such as 250 µm coated fiber, inside a 1 mm OD buffer tube. Such connectors rely on the operator to properly butt the field fiber and the fiber stub inside the splice connector when performing the installation. However, because a furcated fiber is free to move inside the 1 mm buffer tube, the feel of the fiber butting is dulled, which makes the installation more difficult for the craftsperson.

A need therefore exists for improved fiber optic cable furcation assemblies and methods.

SUMMARY OF THE INVENTION

A first aspect of the invention is a furcation assembly for furcating a cable that carries at least one optical fiber. The furcation assembly includes a furcation member having a furcation body having a front section with a front end, and a back section with a back end. The furcation body defines a channel having a channel front section and at least one channel back section. The channel front section is configured either to accommodate a securing form or to be crimpable for securing the furcation member to at least a portion of the cable. The assembly also includes at least one flexible guide defining a guide channel. The at least one guide is secured to the furcation member at the at least one channel back section so that the at least one guide channel connects to the furcation member channel. The assembly also includes at least one flexible protection member defining a protection channel sized to accommodate the at least one fiber. The at least one protection member slidably fits within the at least one guide and is telescopically adjustable relative thereto, with the at least one protection channel connecting with the corresponding at least one guide channel. In example embodiments, the guide and the protection member both comprise tubes.

A second aspect of the invention is a furcation assembly for furcating a buffered cable that carries as least one optical fiber within a buffer tube. The assembly includes a furcation member having opposite front and back ends and an axial channel with corresponding front and back sections respectively open at the front and back ends. The channel front section is configured to accommodate and secure an end portion of the buffer tube. The assembly also includes a flexible guide defining a guide channel and secured to the furcation member within the channel back section so that the guide channel connects to the furcation member channel. The assembly also includes a flexible protection member defining a protection member channel sized to accommodate the at least one fiber. The protection member slidably fits within the guide at the guide back end and is telescopically adjustable while maintaining a connection between the protection member channel and the guide channel.

A third aspect of the invention is a furcation assembly for furcating an unbuffered drop cable that carries as least one optical fiber within a protective cover. The furcation assembly includes a generally cylindrical furcation member having opposite front and back ends and an axial channel with corresponding front and back sections respectively open at the front and back ends. The channel front section is configured to accommodate and secure an end portion of the drop cable. The assembly also includes a flexible guide tube defining a guide tube channel and secured to the furcation member with the channel back end so that the guide tube channel connects to the furcation member channel. The assembly also includes a flexible protection tube defining a protection tube channel sized to accommodate the at least one fiber. The protection tube slidably fits within the guide tube at the guide tube back end and is telescopically adjustable while maintaining a connection between the protection tube channel and the guide tube channel.

A fourth aspect of the invention is a cable assembly product made by a process that includes stripping a buffered drop cable to expose a section of buffer tube having an end, and to expose a section of at least one optical fiber carried in the buffer tube and having an end. The process also includes providing a furcation assembly comprising a furcation member with front and back ends and a central channel, with a guide having an end and that is secured to the furcation member back end. The process further includes securing the furcation member to the buffer tube section so that the exposed fiber portion extends through the guide and beyond the guide end. The process further includes slidably engaging a protection member within the guide so that the at least one optical fiber passes out a back end of the protection member to form an exposed fiber section. The process also includes connectorizing the optical fiber end with a connector. The process also includes sliding the protection member over the exposed fiber section and securing the protection member back end to the connector.

A fifth aspect of the invention is a cable assembly product having an unbuffered drop cable with a protective cover. The assembly is made by a process that includes stripping a portion of a protective cover from the unbuffered drop cable to expose a section of at least one optical fiber. The process also includes providing a furcation assembly comprising a furcation member with front and back ends and a central channel, and a guide having an end and secured to the back end of the furcation member. The process further includes securing the front end of the furcation member to the protective cover so that the exposed fiber portion extends through the guide and beyond the guide end. The process also includes slidably engaging a protection member within the guide so that the at least one optical fiber passes through the protection member and out the protection member back end to form an exposed fiber section. The process further includes connectorizing the optical fiber end with a connector. The process also includes sliding the protection member over the exposed fiber section and securing the protection member back end to the connector.

Additional features and advantages of the invention are forth in the detailed description that follows, and in part will be readily apparent to those skilled in the art from that description or recognized by practicing the invention as described herein, including the detailed description that follows, the claims, and the appended drawings. It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof

BRIEF DESCRIPTION OF THE DRAWINGS

These and other features, aspects and advantages of the present invention are better understood when the following detailed description of the invention is read with reference to the accompanying drawings, in which:

FIG. 7 is a close-up side view similar to FIG. 6, but showing the furcation assembly secured to the drop cable via crimping;

FIG. 8 is a close-up side view of the protection member as slidingly engaged with the guide, and also showing an exposed portion of the fiber extending from the back end of the protection member;

FIG. 9 is a side view of the furcation assembly back end, with a connector added to the fiber end, and showing how the protection member and the bend-limiting connector boot slide towards the connector;

FIG. 10 is a schematic side view of the cable assembly and shows the protection member secured within the connector lead-in tube via crimping, and the connector boot in place at the connector back end, thereby forming the finalized cable assembly that includes the furcation assembly of the present invention;

FIG. 11 is a close-up side view of an end portion of an unbuffered drop cable illustrating how the cable is stripped to expose the optical fiber and also showing the cut-back support members;

FIG. 12 is a side view of the stripped unbuffered drop cable along with the furcation assembly prior to the furcation assembly being secured to the drop cable;

FIG. 13C is a perspective view of the furcation assembly for the unbuffered drop cable that includes the furcation member of FIG. 13A along with a rear guide and a bend-limiting boot;

FIG. 13D is a lengthwise cross-sectional view of the furcation assembly of FIG. 13C;

DETAILED DESCRIPTION OF THE INVENTION

Reference is now made to preferred embodiments of the invention, examples of which are illustrated in the accompanying drawings. Whenever possible, the same or similar reference numbers and symbols are used throughout the drawings to refer to the same or similar parts.

Buffered and Unbuffered Drop Cables

Figure 1:
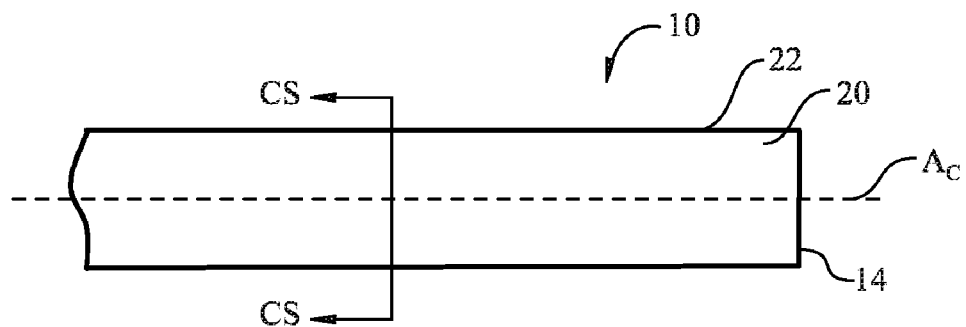
FIG. 1 is a schematic side view of a generic fiber optic drop cable.

FIG. 1 is a schematic side view of a generic fiber optic drop cable ("drop cable") 10 of the type that is furcated using the furcation assemblies of the present invention as described below. Drop cable 10 includes an end 14, a central axis $A_C$, and a body portion 20 that defines a protective cover having an outer surface 22. In an example embodiment, body portion 20 is made from polyethylene (PE). In the discussion below, the terms "body portion" and "protective cover" are synonymous. Protective cover is also referred to in the art as a "protective outer jacket."

While a various types of drop cables 10 exist, they can be divided into two main categories: buffered and unbuffered. A buffered drop cable carries at least one optical fiber in a buffer tube with the fiber loosely arranged therein and typically surrounded by a protective gel. An unbuffered drop cable carries at least one optical fiber directly in the cable body portion, i.e., the protective cover immediately surrounds the fiber. An example of a buffered drop cable is an SST-type drop cable, while an example of an unbuffered drop cable is an ROC-type drop cable. These two main types of drop cables are considered for use with the furcation assemblies of the present invention by way of example.

Figure 2:
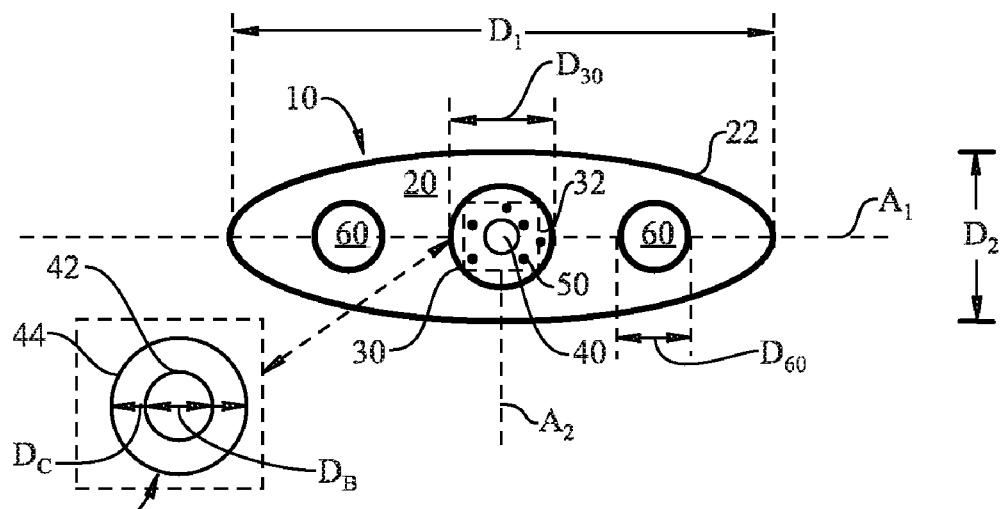
FIG. 2 is a cross-sectional view of the drop cable of FIG. 1 as viewed along the direction CS and illustrating an example embodiment of a buffered drop cable, such as an SST-type drop cable.

FIG. 2 is a cross-section of drop cable 10 of FIG. 1 as viewed in the direction CS, illustrating the basic features of a buffered drop cable such as the aforementioned SST-type drop cable. Buffered drop cable 10 has an elongate cross-sectional shape with a major axis $A_1$ and a minor axis $A_2$. Buffered drop cable 10 also includes a buffer tube 30 that runs along cable central axis 16 within body portion 20 and defines an interior 32. An optical fiber 40 is loosely carried in buffer tube interior 32. A protective gel 50 is also typically contained in buffer tube interior 32. Buffered drop cable 10 also includes flexible strength members 60 arranged within body portion 20 along major axis $A_1$ on either side of buffer tube 30 and that run substantially parallel to central axis 16. In an example embodiment, strength members 60 are formed from glass reinforced plastic (GRP).

As illustrated in the inset of FIG. 2, fiber 40 includes a "bare" inner portion 42 of diameter $D_B$ that includes the core and cladding of the fiber (the core and cladding are not shown) and that is surrounded by a coating 44 of diameter $D_C$. In an example embodiment, $D_B$=125 µm (nominal) and $D_C$=250 µm (nominal). In an example embodiment, buffer tube 30 has a outside diameter (OD) $D_{30}$ of about 3 mm and an inside diameter (ID) $D'_{30}$ of 1.5 mm. Also in an example embodiment, strength members 60 have a diameter $D_{60}$ of about 1.75 mm. In an example embodiment, buffered drop cable 10 has a major-axis diameter $D_1$ of about 8.15 mm and a minor-axis diameter $D_2$ of about 4.4 mm.

Figure 3:
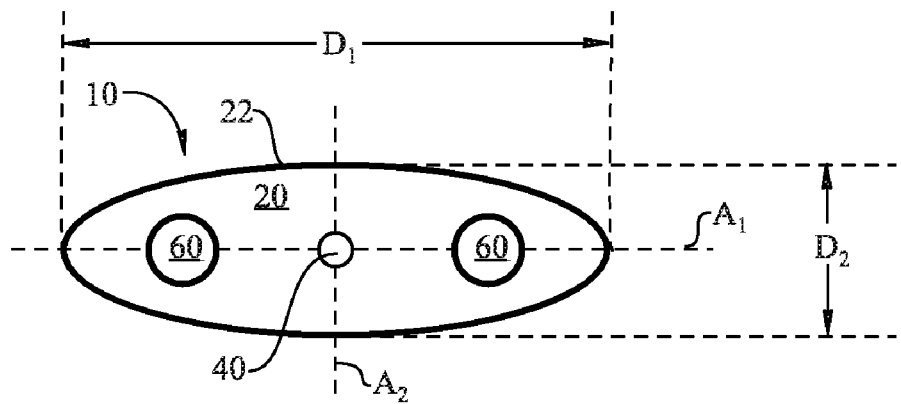
FIG. 3 is a cross-sectional view of the drop cable of FIG. 1 as viewed along the direction CS and illustrating an example embodiment of an unbuffered drop cable, such as an ROC-type drop cable.

FIG. 3 is a cross-sectional diagram similar to FIG. 2 and illustrates the basic features of an unbuffered drop cable 10, such as an ROC-type drop cable. Unbuffered drop cable 10 is similar to a buffered drop cable in that also has an elongate cross-sectional shape with major and minor axes $A_1$ an $A_2$ and similarly arranged strength members 60. In an example embodiment, the unbuffered drop cable cross-section has a "figure-eight" or "peanut" shape rather than a strictly oval shape. However, unbuffered drop cable 10 does not include buffer tube 30. Rather, fiber 40 runs substantially along central axis $A_C$ and is surrounded and held directly by protective cover 20. In an example embodiment, unbuffered drop cable 10 has a major-axis diameter $D_1$ of about 5.4 mm and a minor-axis diameter $D_2$ of about 3.0 mm, and strength members 60 have a diameter $D_{60}$ of about 1.5 mm. In an example embodiment, fiber 40 is the same as that described above for the buffered drop cable. The present invention may include clear optical fibers, or optical fibers which for further preparation and termination have been colored with for example with a permanent ink marker.

Furcation Assembly for Buffered Drop Cables

A first example embodiment of a furcation assembly, and method of forming the assembly, is now described in connection with a buffered drop cable 10 such as described above in connection with FIG. 2. The method is broken down into eight main steps for the sake of description.

Figure 4:
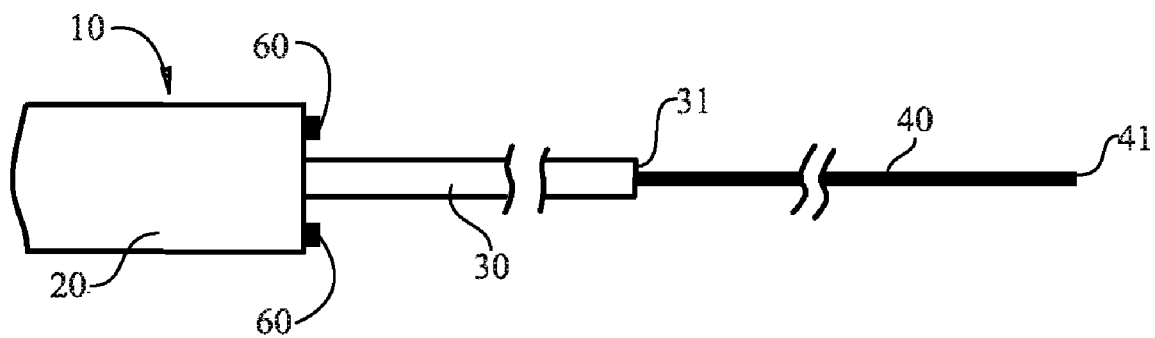
FIG. 4 is a close-up side view of an end portion of a buffered drop cable illustrating how the cable is stripped to expose the buffer tube and the optical fiber, and also showing the cut-back support members.

With reference to FIG. 4, in the first step an end-portion of buffered drop cable 10 is stripped to expose about a 12" (i.e., about a 30 cm) section of buffer tube 30 that now has an end 31. Also exposed is about a 48" (i.e., about a 122 cm) section of coated fiber 40 that now has an end 41. Gel 50 is cleaned from fiber 40, and strength members 60 are cut back to protective cover 20.

Figure 5A:
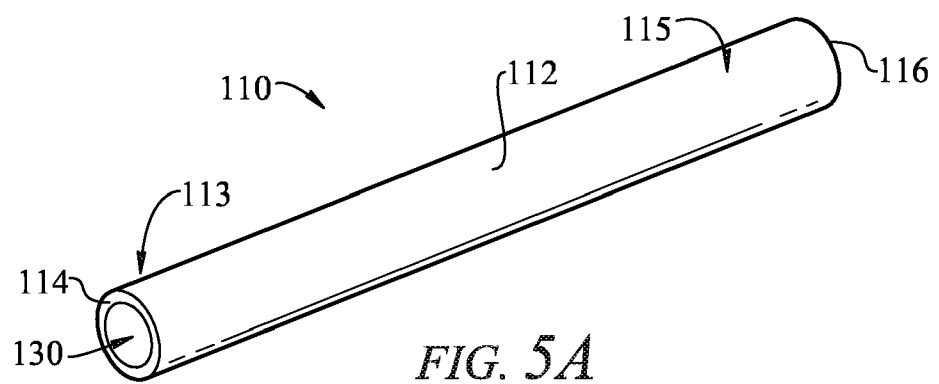
FIG. 5A is a perspective view of an example furcation member of a furcation assembly used to furcated a buffered drop cable.
Figure 5B:
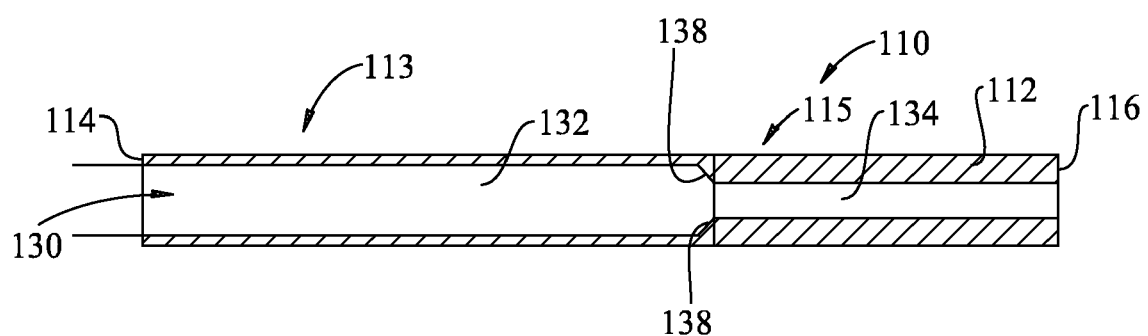
FIG. 5B is a lengthwise cross-sectional view of the furcation member of FIG. 5A.
Figure 6:
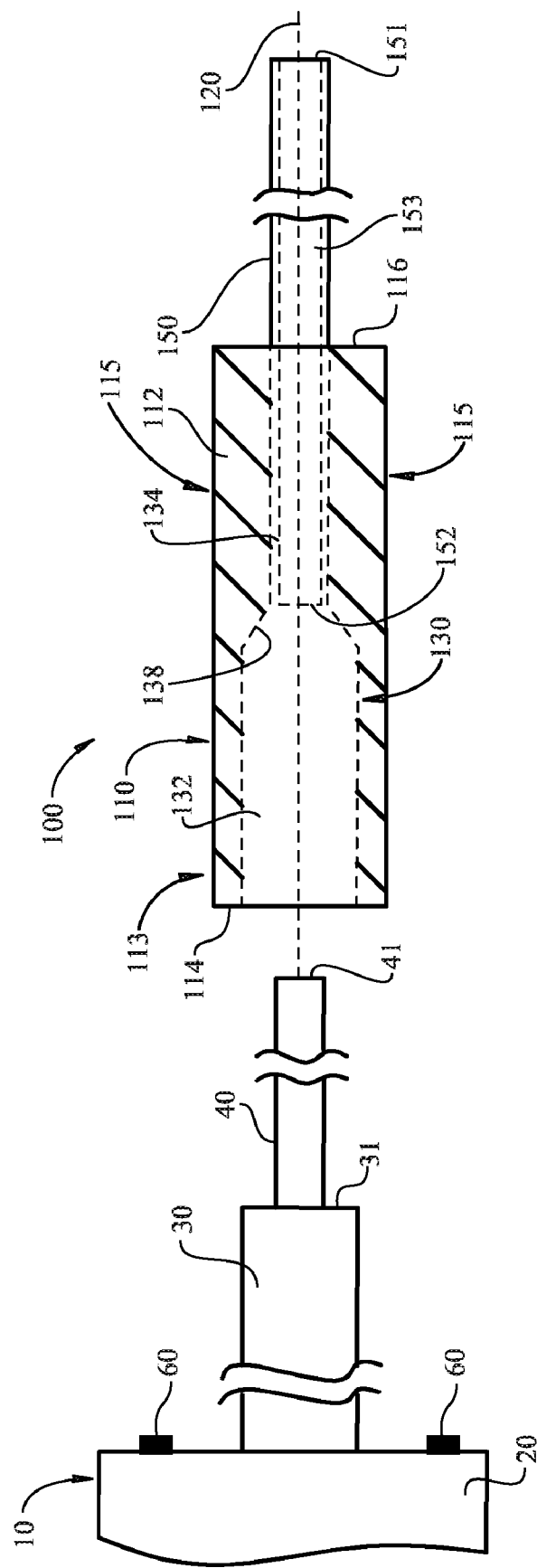
FIG. 6 is a close-up side view of the stripped buffered drop cable, along with the furcation assembly prior to the furcation assembly being secured to the drop cable.
Figure 13A:
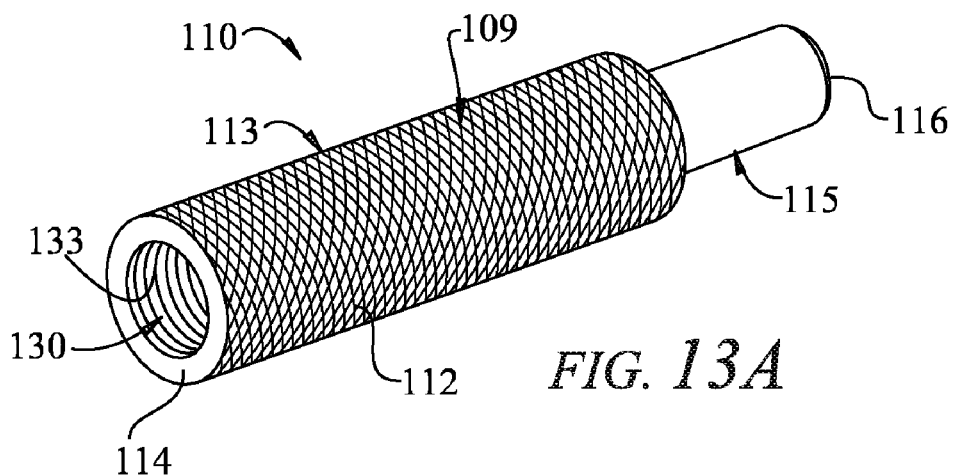
FIG. 13A is a perspective view of an example furcation member of the furcation assembly of FIG. 12 and that includes a knurled outer surface portion and channel front section with an interior securing form as inner threads.
Figure 13B:
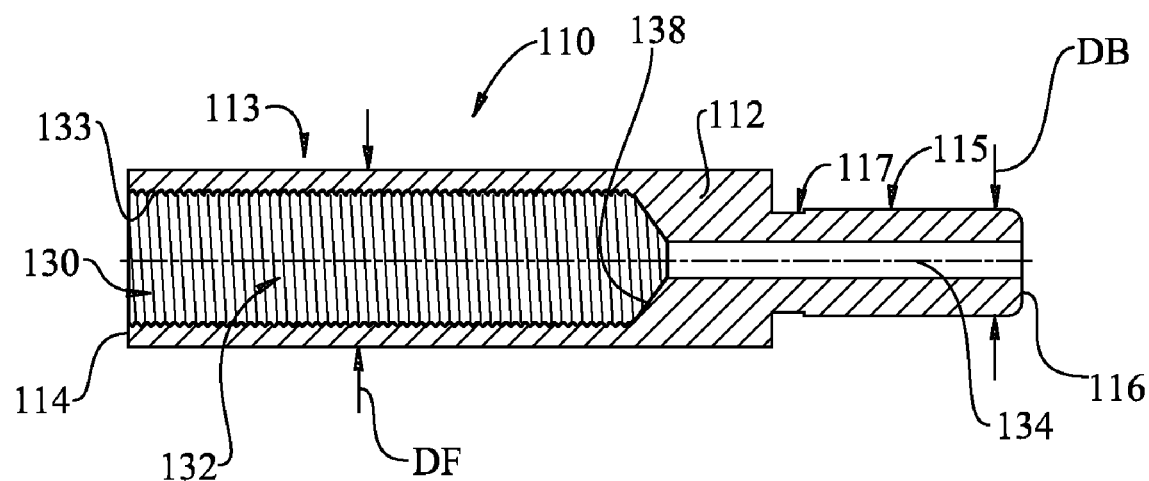
FIG. 13B is a lengthwise cross-sectional view of the furcation member of FIG. 13A.

With reference to FIG. 5A, FIG. 5B and FIG. 6, in the second step a furcation assembly 100 is provided. Furcation assembly 100 includes a furcation member 110 that in an example embodiment includes an elongate (e.g., a generally cylindrical) furcation body 112 having a front end 114 associated with a crimpable front section 113, a back end 116 associated with a back section 115, and a centerline 120. Furcation body 112 defines a central channel 130 that is open at front end 114 and at back end 116. FIG. 5A illustrates an example embodiment of cylindrical furcation body 112 having a round cross-sectional shape. In other embodiments of the present invention, the furcation member 110 can be an elongated crimp tube, can be a compressible boot composed of rubber or plastic and metal. For example, the crimp tube or boot can transition from a buffer tube of 1.65 mm to 900 µm optical fiber. In addition, the present invention can be practiced in the form of a sealed furcation member, including at least one sealant material, for example silicone room temperature vulcanizing sealant integrated within the furcation member, or rubber splicing tape for example commercially available B tape. The sealant seals gaps between the furcation member and adjacent components.

Central channel 130 includes a front section 132 associated with furcation body front section 113 and sized to accommodate buffer tube 30, and a back section 134 sized to accommodate a flexible guide 150 therein, as discussed below. Furcation body 112 includes a beveled or stepped portion 138 that serves as a transition zone between channel front section 132 and the narrower channel back section 134. In an example embodiment, furcation body 112 is about 25 mm in length and has an OD of about 4 mm. In an example embodiment, channel front section 132 has width (i.e., ID of furcation member 110 at front end 114) of 3 mm and channel back section 134 has a width (i.e., ID of furcation member 110 at back end 1146) of 1.7 mm. In an example embodiment, furcation member 110 is made of a malleable metal such as copper or aluminum. Note that crimpable front section 113 makes channel front section 132 crimpable as well.

Furcation assembly 100 further includes a flexible guide 150 having a back end 151 and a front end 152. Guide 150 defines a guide channel 153. Guide 150 is attached (e.g., glued) to channel back section 134 of furcation body 112 at back end 116. In an example embodiment, guide 150 comprises a guide tube, which further in an example embodiment has an OD of about 1.65 mm and an ID of about 1.2 mm, and is about 36" (i.e., about 91 cm) long. In an example embodiment, guide 150 is made of polyvinyl chloride (PVC). In an example embodiment, a portion of guide 150 resides in channel back section 134 and is secured therein.

With reference to FIG. 7, in the third step furcation assembly 100 is slid over the end of the stripped buffered drop cable 10 so that fiber 40 extends through channel back section 134 and through guide 150 so as to extend beyond guide end 151 by about 12" (i.e., about 30 cm). The relatively large ID of guide 150 as compared to the diameter $D_B$ of fiber 40 makes this an easy operation. Furcation assembly is pushed onto exposed buffer tube 30 until buffer tube end 31 abuts beveled portion 138 within furcation member 110 so that an end portion of the buffer tube resides in channel front section 132 of the furcation member.

With continuing reference to FIG. 7, in the fourth step furcation member 110 is crimped (as represented by arrows CR) near front end 114 so that the end portion of buffer tube 30 residing in channel front section 132 is secured within the channel and thus to furcation member 110. This crimping step can be accomplished using a hex crimp die or other type of standard crimping tool.

With reference now to FIG. 8, in the fifth step a flexible protection member 180 having a back end 181, a front end 182, and that defines a protection member channel 183 is provided. In an example embodiment, protection member 180 is a protection tube, and further in an example embodiment has an ID sized to accommodate fiber 40 and an OD sized to fit into guide 150 at guide back end 151. In an example embodiment, protection member 180 has a length of about 12" (i.e., of about 30 cm) and an OD of about 1 mm so that it slidingly fits into guide 150, which in an example embodiment has an ID of about 1.2 mm.

In the sixth step, protection member 180 is slid over the exposed portion of fiber 40 that extends from end 151 of guide 150, with front end 182 facing furcation member 110, while a front portion of the protection member resides within a rear portion of guide 150. When this sliding fit is formed, guide channel 153 connects to protection member channel 183 and the axial position of protection member 180 is telescopically adjusted so that a portion of fiber 40 (e.g., about 8", or about 20 cm) extends from protection member back end 181 and remains exposed. This arrangement makes protection member 180 a telescoping member that can move in and out of guide 150. This arrangement also establishes the basic components of furcation assembly 100.

With reference now to FIG. 9, in the seventh step the exposed portion of fiber 40 is prepared (e.g., stripped and cleaved) for installation (i.e., "connectorization") into an optical fiber connector 200, such as an OPTI-SNAP or UNI-CAM connector available from Corning Cable Systems, LLC, of Hickory, N.C. Connector 200 includes a connector housing 210 having a front end 212 and a back end 214, and a crimpable lead-in tube 220 that extends from the connector housing back end. Prior to attaching connector 200, a bend-limiting connector boot 240 is slid over guide 150 in anticipation of connecting the boot to connector housing back end 214. At this point, fiber 40 is connectorized with a connector 200, thereby forming a cable assembly.

Once connector 200 is attached to fiber 40, then with reference now also to FIG. 10, in the eighth step protection member 180 is pulled toward the connector, and protection member back end 181 is slid into connector lead-in tube 220. The lead-in tube 220 is then crimped with the appropriate tool to secure protection member 180 to the connector, as illustrated by arrows CR. Connector boot 240 is then brought up to connector housing back end 214 to cover now-crimped lead-in tube 220 and a portion 180P of protection member 180 that extends therefrom.

At this point, there is still a section 180S of protection member 180 (e.g., about 4" or about 10 cm) telescoped inside guide 150. Guide 150 and protection member 180 are intentionally left in this configuration so that they slidingly engage, and are not mechanically attached. This allows for expansion and contraction of the entire assembly 100 due to temperature changes. This also allows for protection member 180 to telescope by moving back in forth within guide 150, as indicated by arrow AT. The flexibility of guide 150 and protection member 180 in turn provides for a flexible connectorized end to the otherwise relatively stiff buffered drop cable 10, thereby facilitating the drop cable installation process.

For the case where buffered drop cable 10 includes multiple buffer tubes 30, the above-described process is carried out for each buffer tube and fiber carried therein.

Furcation Assembly for Unbuffered Drop Cables

A second example embodiment of a furcation assembly 100, and method of forming the assembly on an unbuffered drop cable 10, such as the drop cable shown in FIG. 3, is now described. The method is broken down into eight main steps for the sake of description.

With reference to FIG. 11, in the first step an end-portion of unbuffered drop cable 10 is stripped to expose about a 48" (i.e., about a 122 cm) section of coated fiber 40 that now has an end 41. Strength members 60 are cut back to protective cover 20.

In the second step, a furcation assembly is provided. With reference to FIG. 12 and FIGS. 13A through 13D, furcation assembly 100 includes a furcation member 110 that includes an elongate (e.g., a generally cylindrical) furcation body 112 having a front end 114, back end 116 and a centerline 120. Furcation body 112 defines a central channel 130 that is open at front end 114 and at back end 116. Central channel 130 includes a front section 132 having an interior securing form, as illustrated in an example embodiment as threads 133, and that is sized to snugly accommodate unbuffered drop cable 10 so that the securing form can engage protective cover 20. The interior securing form is performing a connection function and can be helical threads, annular threads, bumps, ridges, grooves, or other surfaces for connection. Annular threads have been used successfully as the securing form.

Central channel 130 also includes a back section 134 sized to accommodate a guide 150. Furcation body 112 includes a beveled or stepped portion 138 that serves as a transition zone between threaded channel front section 132 and the narrower channel back section 134. Furcation body 112 may be manufactured from metal such as brass or aluminum, or may be injection molded from an engineering polymer with sufficient strength to hold the securing form (e.g., the threaded geometry). A molded furcation body 112 would be advantageous for a furcation body that accommodates more than one fiber, such as in the multifiber furcation assemblies discussed in greater detail below.

In an example embodiment, furcation body 112 has a length of about 41.5 mm. In an example embodiment, furcation body has a circular cross section and includes a front section 113 having a diameter $D_F$ and a back section 115 have a diameter $D_B$, wherein $D_F > D_B$. In an example embodiment, front section 113 is about 30 mm long and back section 115 is about 11.5 mm long. In an example embodiment, back section 115 has a circumferential indent 117 near the transition to the front section for assisting in attaching a bend-limiting boot 240 to the furcation body, as described below.

With reference in particular to FIG. 13C and FIG. 13D, furcation assembly 100 further includes a flexible guide 150 attached to furcation member 110 at back end 116. Guide 150 has a back end 151, a front end 152, and defines a guide channel 153. In an example embodiment, guide 150 is a guide tube, and further in an example embodiment has an OD of about 1.65 mm and an ID of about 1.2 mm, and is about 36" (i.e., about 91 cm) long. In an example embodiment, guide 150 is made of polyvinyl chloride (PVC). In an example embodiment, a portion of guide 150 resides in channel back section 134 and extends from furcation body back end 116. In an example embodiment, guide 150 is glued to furcation member 110 (e.g., within channel back section 134). A bend-limiting boot 240 is attached to furcation body back section 115 to prevent guide 150 from kinking or otherwise bending too severely. In an example embodiment, boot 240 includes a lip 242 that engages circumferential indent 117 in attaching to furcation member 110. In an example embodiment, front section 113 of furcation member 110 has a knurled surface 109 to assist in the manual handling (and in particular, twisting) of furcation member 110.

Figure 14:
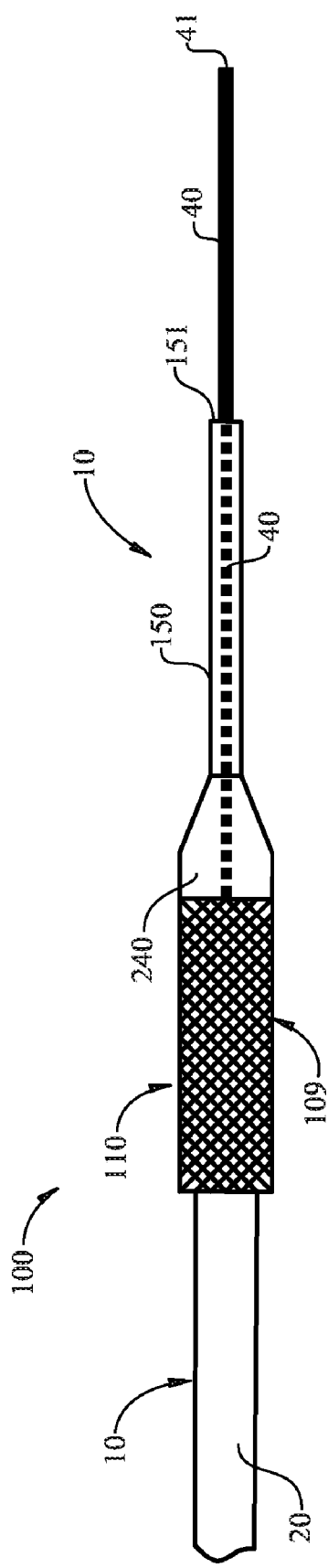
FIG. 14 is similar to FIG. 12 and shows the furcation assembly secured to the unbuffered drop cable by threading the furcation member onto the drop cable protective cover.

With reference now also to FIG. 14, the third step includes sliding the furcation assembly 100 over exposed fiber 40 starting with furcation body front end 114 so that the fiber first passes through the furcation body and then enters guide 150. The fourth step then includes attaching furcation member 110 to drop cable 10 by inserting the drop cable end into channel front section 132 and twisting furcation member 110 so that the securing form (e.g., threads 133) engage protective cover 20 and secure the furcation member to unbuffered drop cable 10. Note that since protective cover 20 has a general elliptical or oval shape (FIG. 3), threads 133 engage only the portion of the protective cover at and/or near major axis $A_1$. Fiber 40, which passes through channel back section 134 and guide 150, stays stationary relative to furcation member 110, i.e., the furcation member rotates around the fiber as the furcation member is twisted onto the unbuffered drop cable.

Figure 15:
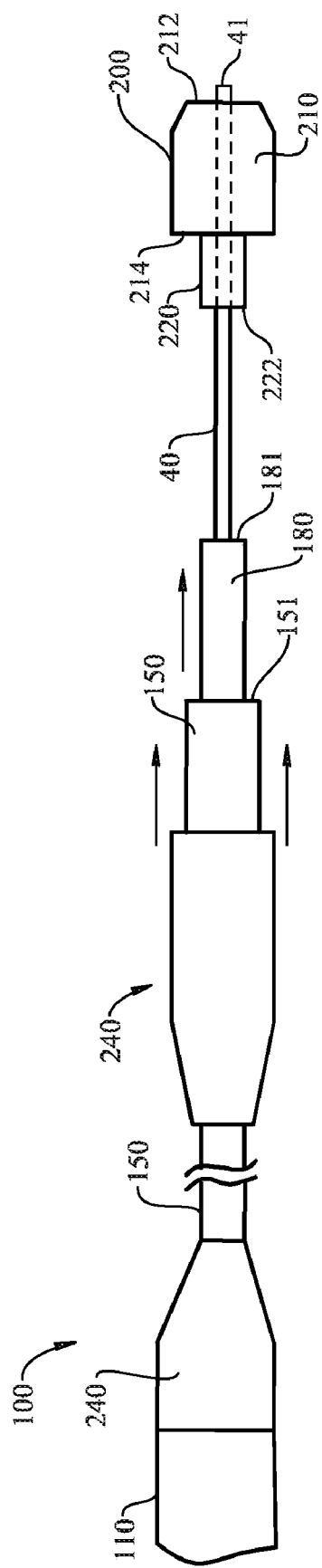
FIG. 15 is schematic side view showing the furcation assembly secured to the unbuffered drop cable and also showing the telescoping protection member and bend-limiting boot prior to connecting the protection member and boot to the connector.

With reference now to FIG. 15, the fifth and sixth steps respectively involve providing a flexible protection member 180 having back and front ends 181 and 182, and that defines a protection member channel 183, and then sliding the protection tube over the exposed portion of fiber 40. The sliding is performed so that the protection member front end 182 slides within guide 150 at guide back end 151, as described above in connection with FIG. 8. This arrangement makes protection member 180 a telescoping member that can move in and out of guide 150 while maintaining the connection between guide channel 153 and protection member channel 183. This arrangement also establishes the basic components of furcation assembly 100.

At this point, a portion of fiber 40 extends beyond protection member back end 181. In an example embodiment, this exposed fiber portion has a length of about 8" (or about 20 cm). An example protection member 180 is in the form of a tube having, for example, a length of about 12" (30 cm) and about a 1 mm outer diameter.

With continuing reference to FIG. 15, in the seventh step the exposed portion of fiber 40 is prepared (e.g., stripped and cleaved) for installation (i.e., "connectorization") into an optical fiber connector 200, such as discussed above. Prior to attaching connector 200, a bend-limiting connector boot 240 is slid over guide 150 in anticipation of connecting the boot to connector housing back end 214. At this point, fiber 40 is connectorized with a connector 200.

Figure 16:
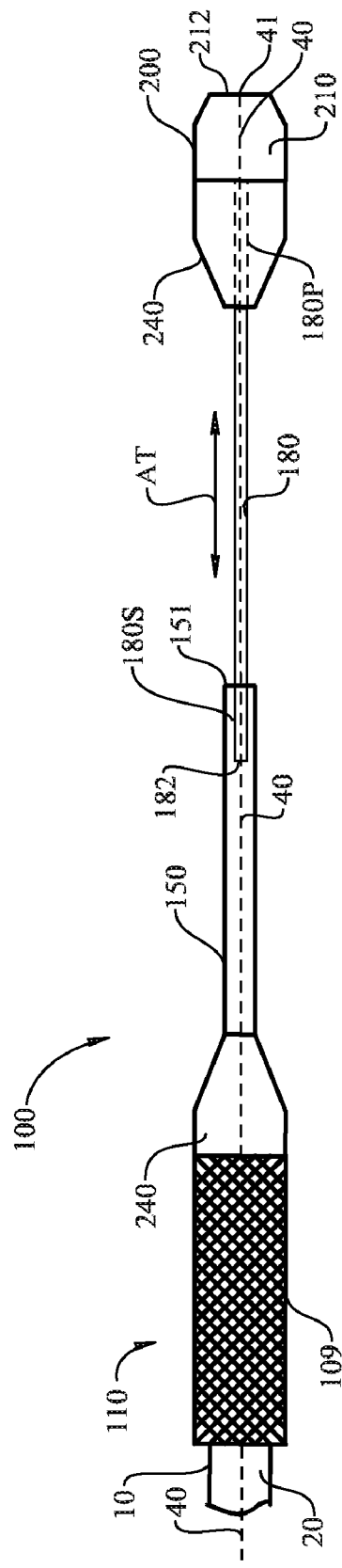
FIG. 16 is similar to FIG. 15, and shows the protection member secured within the connector lead-in tube via crimping, and the connector boot in place at the connector back end, thereby forming the finalized cable assembly that includes the furcation assembly of the present invention.

Once connector 200 is attached to fiber 40, then with reference to FIG. 16 in the eighth step protection member 180 is pulled toward the connector, and protection member back end 181 is slid into connector lead-in tube 220. Lead-in tube 220 is then crimped to secure the protection member to the connector, as illustrated by arrows CR.

Connector boot 240 is then brought up to connector housing back end 214 to cover the now-crimped lead-in tube 220 and a portion 180P of protection member 180 that extends therefrom. Protection member 180 is thus configured to telescope by moving back and forth within guide 150 (as indicated by arrow AT).

At this point, there is still a section 180S of protection member 180 (e.g., about 4" or about 10 cm) telescoped inside guide 150. As in the case of the buffered drop cable, this sliding configuration is intentional to allow for expansion and contraction of the entire assembly due to temperature changes. Likewise, this also allows for protection member 180 to telescope by moving back and forth within guide 150, as indicated by arrow AT. The flexibility of guide 150 and protection member 180 in turn provides for a flexible connectorized end to the otherwise relatively stiff buffered drop cable 10, thereby facilitating the drop cable installation process.

Figure 17A:
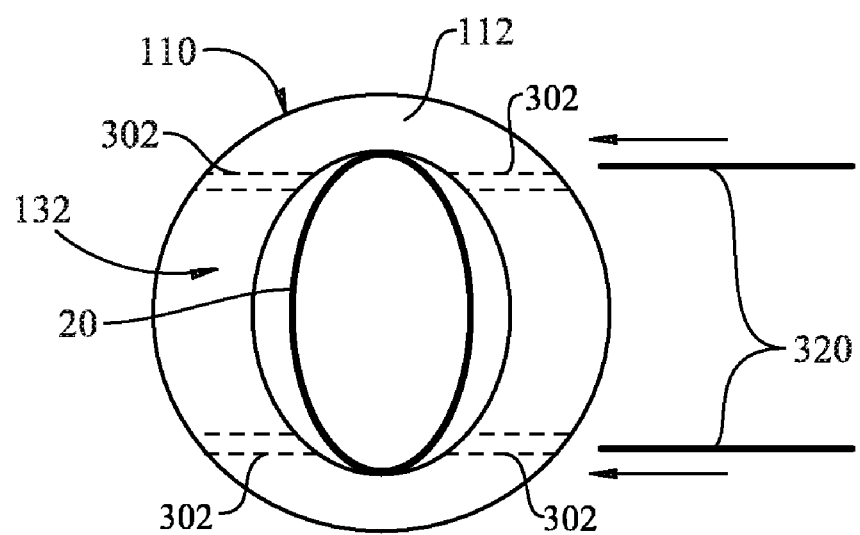
FIGS. 17A and 17B are cross-sectional views of an example furcation member taken perpendicular to furcation assembly centerline and illustrate an alternative approach to securing unbuffered drop cable to furcation member using a cross pin.
Figure 17B:
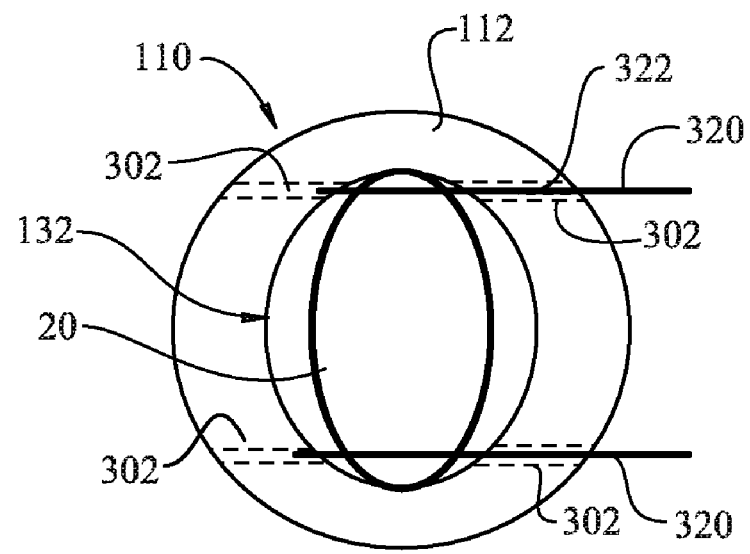

FIGS. 17A and 17B are cross-sectional views of furcation member 110 taken perpendicular to furcation assembly centerline 120 and illustrate an alternative approach to securing unbuffered drop cable to furcation member 10. Rather than including internal threads 133 or other securing form within channel front section 132, one or more guide holes 302 are formed in furcation body 112. Guide holes 302 are formed transverse to centerline 120 just below the tangent of where protective cover 20 would reside within channel front section 132. One or more cross pins 320 are inserted into the one or more guide holes 302 after unbuffered drop cable 10 is inserted into channel front section 132, as shown in FIG. 17B, thereby securing the drop cable within the channel front section. In an example embodiment, channel front section 132 has an oval cross-sectional shape that matches the cross-sectional shape of unbuffered drop cable 10 so as to substantially prevent the drop cable from twisting when the cross pin (or pins) 320 is/are inserted. This approach is especially useful for a drop cable with more than one fiber, as a multifiber furcation body cannot be axially rotated without twisting the fibers therein.

Multifiber Furcation Assemblies

Figure 18A:
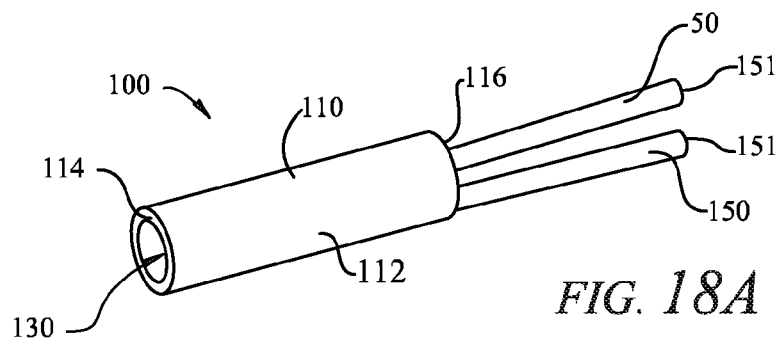
FIG. 18A is a perspective view and FIG. 18B is a lengthwise cross-sectional view of an example multifiber furcation assembly intended for use with a buffered drop cable with a buffer tube that carries multiple fibers.
Figure 18B:
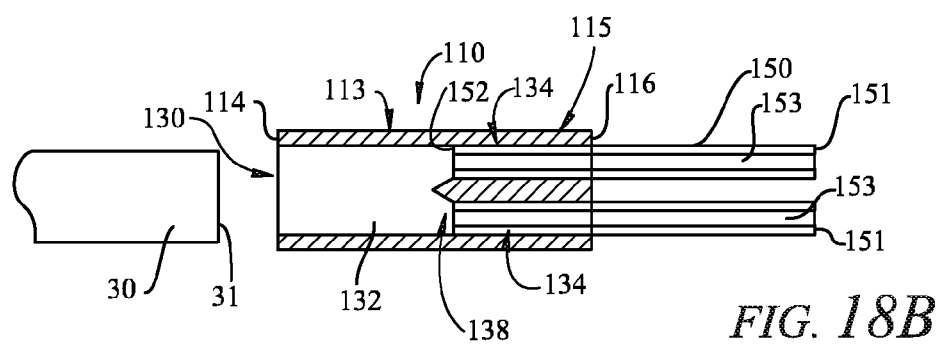

In cases where drop cable 10 (buffered or unbuffered) carries more than one optical fiber 40, a multifiber furcation assembly 100 is used to furcated the drop cable. FIG. 18A is a perspective view and FIG. 18B is a lengthwise cross-sectional view of an example multifiber furcation assembly 100 intended for use with a buffered drop cable 10 with a buffer tube 30 that carries multiple fibers 40. Multifiber furcation assembly 100 is similar to the single-fiber version, except that furcation member 110 is configured to accommodate two or more guides 150. In an example embodiment, furcation member 110 includes two or more channel back sections 134 that each accommodate an end portion of guide 150. The method of furcating a buffered drop cable 10 using a multifiber furcation assembly 10 such as shown FIGS. 18A and 18B is essentially the same as for a single-fiber furcation assembly, except that the different fibers 40 are fed into different guides 150 and protection members 180, and are separately connectorized in the manner described above. For buffered drop cables 10 that included multiple buffer tubes 30, each buffer tube is furcated with a furcation assembly 100.

Figure 19A:
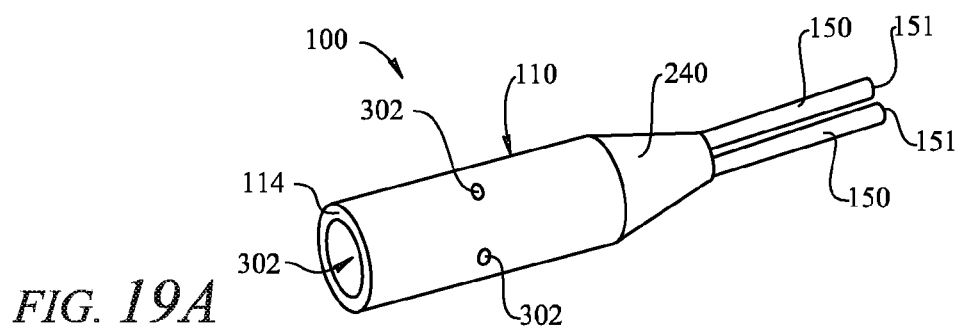
FIG. 19A is a perspective view and FIG. 19B is a lengthwise cross-sectional view of an example multifiber furcation assembly intended for use with an unbuffered drop cable that carries multiple fibers.
Figure 19B:
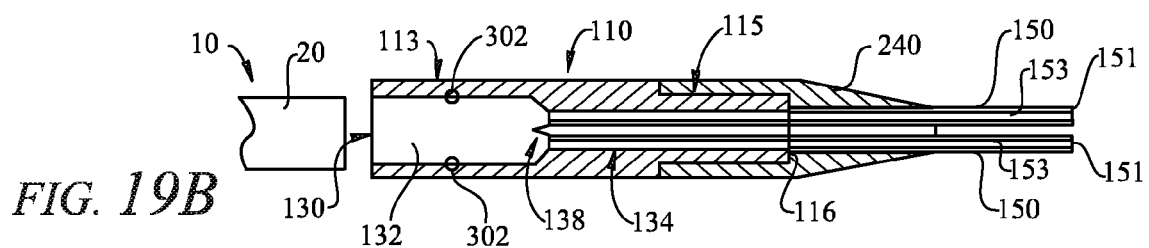

FIG. 19A is a perspective view and FIG. 19B is a lengthwise cross-sectional view of an example multifiber furcation assembly 100 intended for use with an unbuffered drop cable 10 that carries multiple fibers 40. Multifiber furcation assembly 100 is similar to the single-fiber version, except that furcation member 110 is configured to accommodate two or more guides 150. In an example embodiment, furcation member 110 includes two or more channel back sections 134 that each accommodate an end portion of a guide 150. The method of furcating a buffered drop cable 10 using a multifiber furcation assembly 10 such as shown FIGS. 19A and 19B is essentially the same as for a single-fiber furcation assembly, except that the different fibers 40 are fed into different guides 150 and protection members 180, and are separately connectorized in the manner described above. The furcation member of FIGS. 19A and 19B is the cross-pin type shown in FIGS. 17A and 17B.

Advantages

The furcation assemblies 100 and the corresponding methods of furcating a drop cable as described above have a number of advantages. For example, installation does not require any special tools beyond those normally provided with a connector installation kit. Also, connectors 200 specifically designed for use with 250 μm fibers 40 can be easily installed, which provides for improved mechanical robustness of the drop cable and connection. In addition, the tedious step of threading a long, small-diameter tubing onto a long section of exposed fiber is eliminated. Further, the telescoping function of the protection member mitigates the impact of tubing shrinkage and thermal expansion on optical loss and allows for the use of less expensive tubing materials. The protection member also provide a degree of flexibility to the entire structure, which facilitates installation of the drop cable.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A furcation assembly for furcating a cable that carries at least one optical fiber, comprising:
    a furcation member having a furcation body having a front section with a front end, a back section with a back end, the body defining a channel having a channel front section and at least one channel back section, with the channel front section configured either to accommodate a securing form or to be crimpable for securing the furcation member to at least a portion of the cable;
    at least one flexible guide defining a guide channel and secured to the furcation member at the at least one channel back section so that the at least one guide channel connects to the furcation member channel and extends from the channel back section; and
    at least one flexible protection member defining a protection channel sized to accommodate the at least one fiber, wherein the at least one protection member slidably fits within the at least one guide and is telescopically adjustable relative thereto, with the at least one protection channel connecting with the corresponding at least one guide channel, wherein the at least one optical fiber enters the front end of the furcation body passing through the channel of the furcation body and through the guide and protection member at the back end.

2. The furcation assembly of claim 1, wherein the furcation body is cylindrical.

3. The furcation assembly of claim 1, wherein the drop cable includes a buffer tube that contains multiple fibers, and wherein the furcation member includes multiple channel back sections respectively connected to multiple guides, and multiple protection members respectively slidably engaged with the multiple guides.

4. The furcation assembly of claim 1, wherein the cable is a drop cable includes a buffer tube that contains the at least one fiber, and further comprising:
    the channel front section sized to accommodate an end portion of the buffer tube and configured to hold the buffer tube end portion therein, with the at least one fiber running through the at least one guide channel and the at least one protection member channel.

5. The furcation assembly of claim 4, wherein the buffer tube is crimpably secured within the channel front section.

6. The furcation assembly of claim 1, wherein the at least on flexible guide comprises a tube.

7. The furcation assembly of claim 1, wherein the at least one flexible protection member comprises a tube.

8. The furcation assembly of claim 1, wherein the cable comprises a drop cable.

9. The furcation assembly of claim 1, wherein the furcation member body is elongate.

10. The furcation assembly of claim 1, wherein the interior securing form is selected from the group of securing forms comprising: helical threads, annular threads, bumps, ridges, and grooves.

11. A cable assembly, comprising:
    the furcation assembly of claim 4;
    at least one connector operably connected to an end of the at least one fiber; and
    the at least one protection member secured to the at least one connector so that the protection member channel contains a portion of the at least one optical fiber.

12. The cable assembly of claim 11, wherein the at least one connector includes a crimpable lead-in tube, and wherein an end portion of the at least one protection member resides within the lead-in tube and is secured thereto.

13. The furcation assembly of claim 1, wherein the cable includes a protective cover that surrounds the at least one fiber, and further comprising:
    the channel front section sized to accommodate an end portion of the protective cover and configured to hold the protective cover end portion therein, with the at least one fiber running through the at least one guide channel and the at least one protection member channel.

14. The furcation assembly of claim 13 wherein the channel front section includes an interior securing form configured to engage the protective cover.

15. The furcation assembly of claim 13, wherein the channel front section includes one or more guide holes configured to receive corresponding one or more cross pins that engage the protective cover to secure the cable within the channel front section.

16. The furcation assembly of claim 1, wherein the cable contains multiple fibers, and wherein the furcation member includes multiple channel back sections respectively connected to multiple guides, and multiple protection members respectively slidably engaged with the multiple guides.

17. A cable assembly, comprising:
    the furcation assembly of claim 13;
    at least one connector operably connected to an end of the at least one fiber; and
    the at least one protection member secured to the at least one connector so that the protection member channel contains a portion of the at least one optical fiber.

18. The cable assembly of claim 17, wherein the at least one connector includes a lead-in tube, and wherein an end portion of the protection member resides within the lead-in tube and is secured thereto.

19. A cable assembly that includes a furcation assembly for furcating a buffered cable that carries at least one optical fiber within a buffer tube, comprising:
- a furcation member having opposite front and back ends and an axial channel with corresponding front and back sections respectively open at the front and back ends, with the front end of the channel front section securing an end portion of the buffer tube;
- a flexible guide defining a guide channel and secured to the furcation member within the channel back section so that the guide channel connects to the furcation member channel;
- a flexible protection tube defining a protection tube channel sized to accommodate the at least one fiber, wherein the protection tube slidably fits within the guide channel and is telescopically adjustable while maintaining a connection between the protection tube channel and the guide channel, wherein the at least one optical fiber enters the front end of the furcation member passing through the axial channel of the furcation member and through the guide and protection member at the back end; and
- a connector operably connected to an end of the at least one optical fiber, wherein the protection tube is secured to the connector and the protection tube channel contains a portion of the at least one optical fiber.

20. The cable assembly of claim 19, wherein the furcation member is crimpable so as to crimpably secure the buffer tube end portion in the channel front end.

21. A cable assembly that includes a furcation assembly for furcating an unbuffered drop cable that carries at least one optical fiber within a protective cover, comprising:
- a furcation member having opposite front and back ends and an axial channel with corresponding front and back sections respectively open at the front and back ends, with the channel front section securing an end portion of the drop cable;
- a flexible guide defining a guide channel and secured to the furcation member at the channel back end so that the guide channel connects to the furcation member channel;
- a flexible protection tube defining a protection tube channel sized to accommodate the at least one fiber, wherein the protection tube slidably fits within the guide channel and is telescopically adjustable while maintaining a connection between the protection tube channel and the guide channel, wherein the at least one optical fiber enters the front end of the furcation member passing through the axial channel of the furcation member and through the guide and protection member at the back end; and
- a connector operably connected to an end of the at least one optical fiber, wherein the protection tube is secured to the connector and the protection tube channel contains a portion of the at least one optical fiber.

22. The cable assembly of claim 21, wherein the channel front section includes an interior securing form configured to engage the protective cover.

23. The cable assembly of claim 21, wherein the channel front section includes one or more guide holes configured to receive corresponding one or more cross pins that engage the protective cover to secure the drop cable within the channel front section.

* * * * *